B. E. VINCENT.
FLUID PRESSURE CLUTCH.
APPLICATION FILED JUNE 8, 1918.
1,300,898. Patented Apr. 15, 1919.
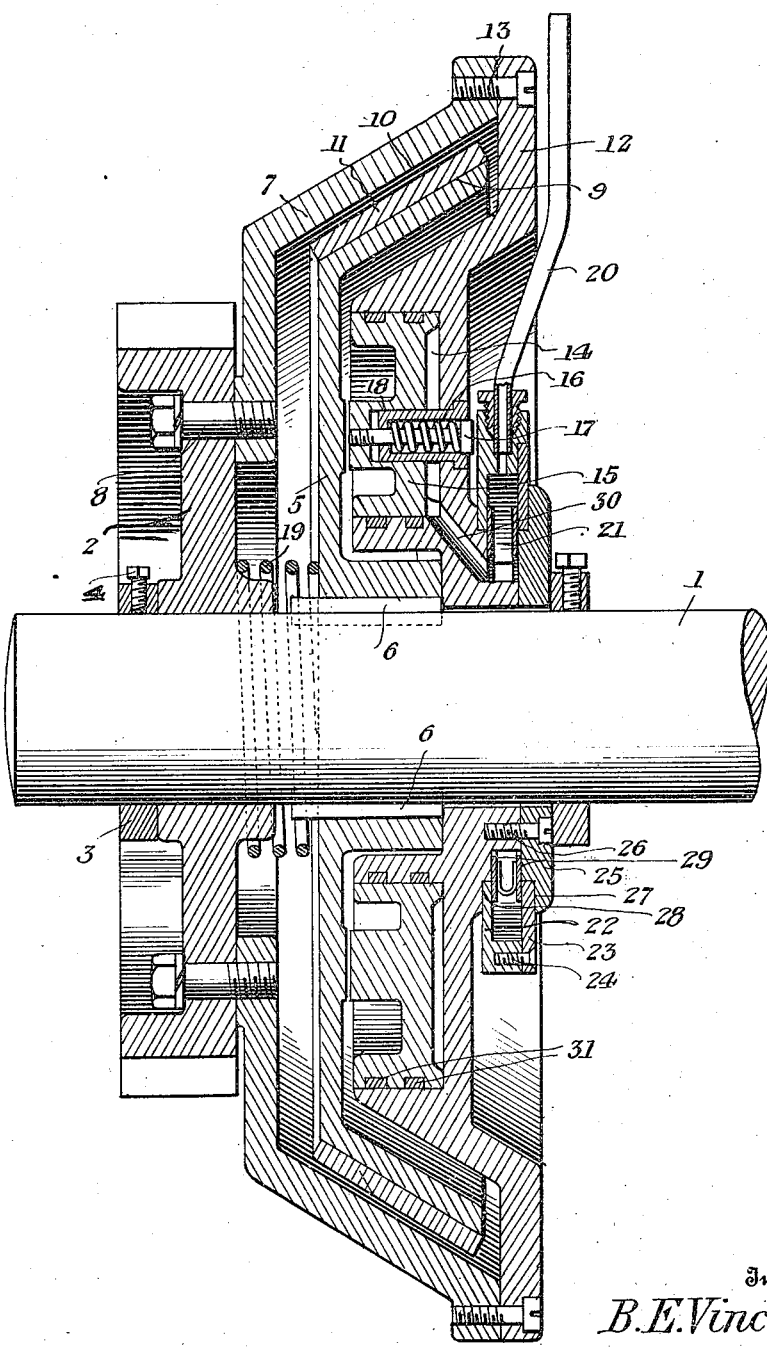
Witness
Le Roy Kauffman.
P. M. Smith.
Inventor
B. E. Vincent
By Victor J. Evans
Attorney

UNITED STATES PATENT OFFICE.

BEE ELMER VINCENT, OF SWIFTS, OHIO, ASSIGNOR OF ONE-HALF TO PATRICK HENRY HAYS, OF SWIFTS, OHIO.

FLUID-PRESSURE CLUTCH.

1,300,898.   Specification of Letters Patent.   Patented Apr. 15, 1919.

Application filed June 8, 1918. Serial No. 238,895.

*To all whom it may concern:*

Be it known that I, BEE ELMER VINCENT, a citizen of the United States, residing at Swifts, in the county of Washington and State of Ohio, have invented new and useful Improvements in Fluid - Pressure Clutches, of which the following is a specification.

This invention relates to fluid pressure clutches, the object in view being to provide a clutch of the character referred to for imparting motion from a driving member, such as a shaft to a driven member such as a gear, friction wheel, belt wheel, or any similar element to be driven.

With the above and other objects in view, the invention consists in the construction, combination and arrangement of parts, as herein described, illustrated and claimed.

The accompanying drawing represents a diametrical section through the improved clutch, showing the driving shaft in elevation.

In illustrating the improved clutch, I have shown the driving member 1 in the form of a shaft, and the driven member 2 in the form of a gear which is normally loose on the shaft 1 but held against longitudinal movement thereon by means of an abutment collar 3 fastened to the shaft 1 by a set screw 4 or the equivalent thereof.

5 designates the driving clutch member which rotates with and is driven by the shaft 1, said clutch member 5 being feathered to the shaft by means of one or more splines 6, which, however, do not interfere with the movement of the clutch member 5 longitudinally of the shaft 1 to enable the same to be moved into and out of engagement with an opposing clutch member 7 which is secured to the driven member 2 by fastening means 8. For convenience, the clutch member 5 is shown in the form of a cone, the same being provided with a cone-shaped clutching face 9 and the clutch member 7 being provided with a correspondingly shaped clutch face 10. 11 designates a facing band applied to the working face of the clutch member 5. The clutch member 7, by reason of its shape, also forms a portion of a housing which incloses the clutch member 5.

12 designates a rotary abutment member which also constitutes another part of the housing for the clutch member 5. Such housing enables an ample supply of lubricant to be placed therein, so as to prevent the working parts from becoming dried and being thereby subjected to undue wear. The member 12 is secured to the clutch member 7 by fastening means 13. The abutment member 12 is formed in one side thereof with an annular fluid pressure chamber 14, in which is mounted for reciprocatory movement an annular fluid pressure piston 15 which is movable toward and away from the adjacent face of the clutch member 5, said piston being normally held out of contact with the clutch member 5 by means of a circular series of springs 16 surrounding headed guide pins or bolts 17 which are received in spring receiving recesses 18 in the piston and secured to and carried by said piston. Therefore, as the piston is moved to the left in the drawings, said springs are compressed and they serve thereafter to move the piston away from the clutch member 5. This operation is assisted by another larger spring 19 which encircles the shaft 1 and is interposed between the clutch member 5 and the driven member 2.

The fluid, compressed air, or the equivalent thereof, is supplied to the clutch through a pipe 20 which communicates at its discharge end with an annular fluid chest 21, the latter encircling the shaft 1 and being non-rotary. The fluid chest 21 is formed in two annular sections 22 and 23 secured together by a fluid tight joint by fastening means 24. A retaining collar 25 is secured to the hub of the abutment member 12 by fastening means 26 and is formed with an annular rabbet 27 to receive the section 23 of said non-rotary fluid chest. The member 12 is also formed with an annular rabbet 28 to receive the other section 22 of the fluid chest. Pressure sustained packing members or rings 29 extend across the joints between the sections 22 and 23 of the non-rotary fluid chest and the corresponding surfaces of the members 12 and 25 so as to prevent escape of the fluid used for operating the clutch. The fluid chest 21 communicates with the fluid pressure chamber 14 by means of one or more ports or passages 30. Suitable packing rings 31 extend around the inner and outer concentric surfaces of the piston 15 and work in contact with the corresponding walls of the fluid pressure chamber 14 to prevent leakage of the fluid.

From the foregoing description taken in connection with the accompanying drawing, it will be understood that practically all parts of the clutch mechanism are rotatable with the exception of the fluid chest and the fluid supply pipe leading thereto. When pressure is admitted to the fluid chest, it is transmitted through the ports 30 to the fluid pressure chamber where it acts to press the piston against the clutch member 5 and force the latter into clutching engagement with the other clutching member 7, motion in this way being transmitted from the shaft 1 to the driven member 2. When the pressure is relieved, the springs 16 and 19 serve to shift the clutch member 5 away from the clutch member 7 thus allowing the driven member 2 to remain stationary.

I claim:—

1. In a fluid pressure clutch, the combination of a rotary driving clutch member, a rotary driven clutch member, a rotary abutment member arranged in opposition to said driving clutch member and embodying an annular fluid pressure chamber, a non-rotary fluid chest in constant communication with said fluid pressure chamber, and a fluid pressure piston mounted for reciprocatory movement in said fluid pressure chamber and adapted to shift said driving clutch member into engagement with said driven clutch member.

2. In a fluid pressure clutch, the combination of a rotary driving clutch member, a rotary driven clutch member, a rotary abutment member arranged in opposition to said driving clutch member and embodying an annular fluid pressure chamber, a non-rotary fluid chest in constant communication with said fluid pressure chamber, and a fluid pressure piston mounted for reciprocatory movement in said fluid pressure chamber and adapted to shift said driving clutch member into engagement with said driven clutch member, and means for retracting said fluid pressure piston to permit the driving clutch member to move out of engagement with the driven clutch member.

3. In a fluid pressure clutch, the combination of a rotary driving clutch member, a rotary driven clutch member, a rotary abutment member arranged in opposition to said driving clutch member and embodying an annular fluid pressure chamber, a non-rotary fluid chest in constant communication with said fluid pressure chamber, a fluid pressure piston mounted for reciprocatory movement in said fluid pressure chamber and adapted to shift said driving clutch member into engagement with said driven clutch member, and resilient means on said abutment member for moving said piston away from the driving clutch member.

4. In a fluid pressure clutch, the combination of a rotary driving clutch member, a rotary driven clutch member, a rotary abutment member arranged in opposition to said driving clutch member and embodying an annular fluid pressure chamber, a non-rotary fluid chest in constant communication with said fluid pressure chamber, a fluid pressure piston mounted for reciprocatory movement in said fluid pressure chamber and adapted to shift said driving clutch member into engagement with said driven clutch member, a driving shaft to which said driving clutch member is feathered and upon which said driving clutch member is slidable, and a driven member normally loose on said shaft and carrying said driven clutch member.

5. In a fluid pressure clutch, the combination of a rotary driving clutch member, a rotary driven clutch member, a rotary abutment member arranged in opposition to said driving clutch member and embodying an annular fluid pressure chamber, a non-rotary fluid chest in constant communication with said fluid pressure chamber, and a fluid pressure piston mounted for reciprocatory movement in said fluid pressure chamber and adapted to shift said driving clutch member into engagement with said driven clutch member, said driven clutch member and said abutment member being formed to provide a housing in which the driving clutch member and fluid pressure piston are inclosed.

In testimony whereof I affix my signature.

BEE ELMER VINCENT.